Patented Dec. 31, 1946

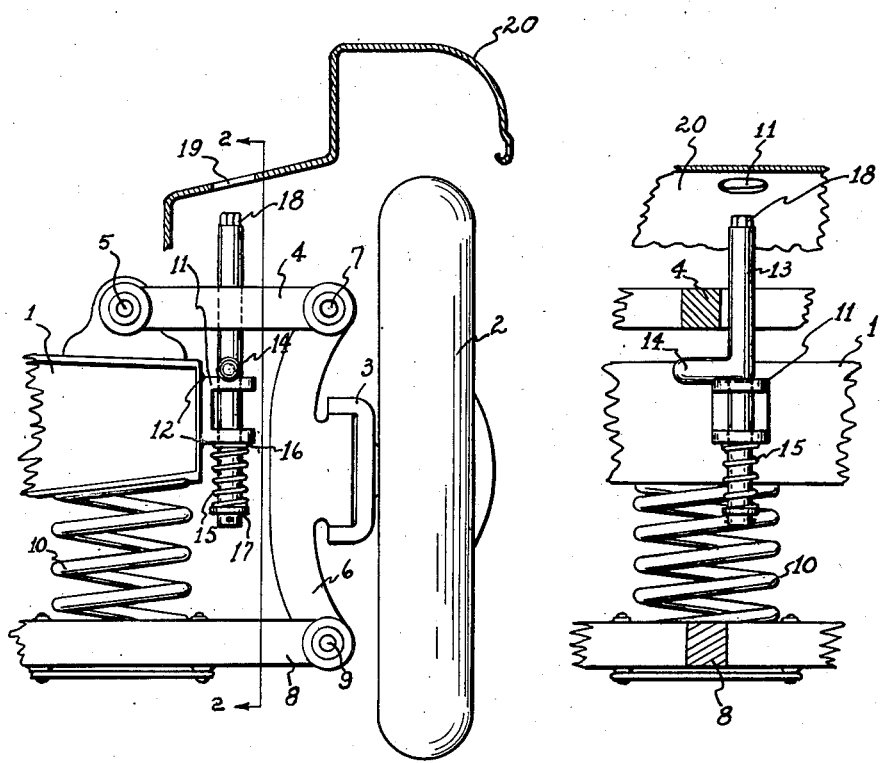

2,413,289

UNITED STATES PATENT OFFICE 2,413,289

JACKING ATTACHMENT FOR FRONT WHEELS

Clarence F. Carter, Danville, Ill.

Application October 8, 1945, Serial No. 621,023

6 Claims. (Cl. 280—150)

This invention relates to a device to be attached to an automobile to assist in jacking the automobile and is particularly useful in such connection when a tire is deflated. It relates particularly to a device to be attached to the front wheels and frame of a car having conventional knee action.

In cars employing knee action the frame of the car is attached to the axle through a yieldable connection comprising a spring and pivotal members in order to give the car easy riding qualities. The trend of the modern cars is to continually lower the axle and related cooperative parts for the purpose of improving stability and riding qualities. The combination of lowering the car closer to the ground and the use of knee action makes it almost impossible to jack a car by placing the jack under the axle or a member attached to the axle when a tire is deflated because there is not enough room between the axle of the car and the ground to place an ordinary car jack. Furthermore if the jack were placed under a member attached to the frame such as the car bumper, it is impossible to lift the axle and the wheel from the ground without first raising the spring portion of the flexible connection to the limit of flexibility and thereafter lifting the axle with the frame through the tensile strength of the spring member. This requires raising the jack throughout a considerable distance vertically before the axle and frame will be lifted together which is impractical if not impossible using the ordinary car jack. Furthermore such lifting tends to be harmful to the spring member and to the knee action.

It is therefore an object of the present invention to attach to the car a permanent device which makes it possible to lift the wheel and tire assembly from the ground by means of an ordinary jack or lifting device applied to a member attached to the frame of the automobile such as the protruding bumper. By such an attachment other special equipment is not necessary and the ordinary car jack may be used.

It is a further object of the invention to attach my device to the frame of a car and to position the device in cooperative manner with the knee action of the front axle which when a jack is applied to the front bumper will minimize the amount of vertical movement of the jack before the frame and the axle will be locked and then raised in locking position.

It is also an object of the invention to position the locking means sufficiently below the point where the locking is to occur to allow for the dropping of the axle a distance equal or slightly greater than the amount of drop due to a deflated tire and still permitting the locking device to engage and lock the frame to the axle during the jacking operation. The devices previously used for this purpose have not taken into account this factor and have therefore been found to be impractical.

It is also an object of this invention to provide a cheap and economical locking device. This is an essential feature of my device and is important since accessories of this kind must not only be practical in their operation but economical in their construction or the car user will not employ them.

It is a further object of the invention to provide a spring means attached to my device which prevents rattling of the device when it is not in use.

Another important object of my device is to position the device so that it may be turned into engaging position from a point substantially above the axle of the car such as through a hole under the hood, a hole within the trunk compartment or a hole in the fender. This completely eliminates the necessity of the user or others from crawling underneath the car and getting dirty as well as making it generally convenient. All that is necessary in my device is to take an ordinary wrench and from a standing position, insert it through a hole in the body of the car and then turn the device to locking or engaging position. This operation locks the frame to the axle and an ordinary jack inserted under the bumper will jack the car with a minimum amount of movement of the jack.

Other objects, advantages and uses of my invention will become apparent by referring to the drawing in which Figure 1 shows a front view of the device turned in locking or engaging position. Figure 2 is a cross sectional side view along the lines 2—2 of Figure 1.

Referring to the drawing, the frame of the car is represented by the numeral 1. A tire and wheel assembly 2 is attached to the axle 3. The knee action assembly comprises a horizontal pivotable member 4 pivotably attached to the frame at 5. A vertical pivotable member 6 is pivotably attached at 7 to the horizontal pivotable member 4 and is also attached to the tire and wheel assembly 2 through the axle 3. A second horizontal pivotable member 8 is pivotably attached to vertical member 6 at point 9. A spring member 10 provides a yieldable connection between the frame and the axle and is attached both to the frame 1 and to the horizontal member 8. The above is typical of the type of yieldable connection used in modern cars for connecting the front axle and the frame.

My attachment comprises the following: a vertical support 11 is welded to the frame at points 12. A vertical rod 13 is journalled in the support 11 and extends above and below the support 11 a substantial distance as shown for the purpose hereinafter described.

A protruding member or hook 14 is attached to the rod 13 adjacent the upper edge of the support 11. A groove is provided in the upper edge of the support 11 for the member 14 to rest in when the rod 13 and hook 14 are turned into engaging or locking position as shown on the drawing. The support 11 is positioned sufficiently below the upper horizontal member 4 of the knee action so that when the axle of the car drops, due to a deflated tire, there will be sufficient room between the lower edge of the horizontal member 4 and the upper edge of the support 11 to permit turning the rod 13 and the hook 14 into engaging position. Depending upon the type of car and the size of the tire, the exact position of the support 11 can be determined and placed on the frame 1 accordingly. Sufficient tolerance should be allowed so that the rod can be readily turned into engaging position when a tire is deflated. Such tolerance may necessitate raising the jack a small amount until the hook 14 engages the lower edge of the horizontal member 4 and thereby locking the frame 1 with the axle of the car but this slight vertical movement is insignificant to the amount of raising that occurs when my device is not used as heretofore explained. Furthermore the support 11 and the rod 13 should be sufficiently removed horizontally from the horizontal element 4 as shown in Figure 2 so that when hook 14 is in disengaging position which is the case when the rod 13 is rotated 90° from that shown in Figure 2, that no part of the device will engage the horizontal element 4 permitting free movement of the knee action and the spring 10.

A spring 15 is provided and is positioned around the rod 13 and fastened to the support 11 at point 16 and to the rod at point 17. This is a compression spring and its primary purpose is to prevent the rod from rattling when it is in disengaging position. It also permits some vertical movement of the rod so that the rod and hook may be turned into engaging position and held snugly in the groove in the upper edge of the support 11. The support 11 serves as a support for the hook during the raising of the axle and frame into locking position. The rod 13 is provided with a nut 18 and the rod 13 extends sufficiently above the frame of the car so that a hole in the body of the car will permit insertion of an ordinary socket wrench through the hole and the nut 18 thereby engaged for turning the rod to either disengage the device from operating position or place it in engaging or operating position. This eliminates the necessity of crawling under the car to place my device in engaging position and therefore has many advantages. The exact position of the hole through the body of the car depends upon the make of the car. It may be either through a fender or through a hole under the hood or through a hole in the trunk compartment. I have illustrated the device for a type of car in which the hood may be raised and a wrench inserted through the hole 19 in the body portion 20.

Other modifications of the drawing may be made within the scope of my invention. My invention is only limited by the following claims.

I claim as my invention:

1. An apparatus substantially as described for locking the frame of a vehicle such as an automobile with the axle in which the frame and axle are normally yieldably connected by a spring and knee action and in which the knee action comprises an upper horizontal pivotable arm attached to the frame, a lower horizontal pivotable arm, a spring attached to the lower pivotable arm and to the frame, a vertical arm pivotably attached to the upper and lower pivotable arms, and said vertical arm also attached to the axle, comprising a vertical support attachable to the frame below the upper pivotable arm of the knee action, a rotatable rod journalled in said support and extending below and above said support, a horizontal hook attached to said rod adjacent the upper edge of said support for locking said upper arm with the frame of the vehicle and said hook positioned to bear on said support when in engaging position and thus serving to raise the upper arm and frame together in locking position whenever a vertical movement is applied to the frame of the vehicle, and said hook arranged and adapted such that when it is not in such engaging position it may freely move past the upper arm of the knee action to permit free movement of the yieldable connection between the frame and the axle.

2. The apparatus of claim 1 further defined by means comprising a spring attached to the lower end of the support around said rod and also to the lower portion of said rod to prevent rattling when the hook is not in engaging position.

3. The apparatus of claim 1 further defined by means for rotating the rod comprising a nut on the end of the rod above the hook and said rod positioned and extending sufficiently above the support to permit turning of the rod by a wrench from a point substantially above the frame of the vehicle.

4. The apparatus of claim 1 further defined in that the support is adapted to be attached to the frame in a manner such that the hook lies sufficiently below the lower edge of said upper horizontal arm of the knee action to permit the hook to be turned on to the support into position to engage the upper arm even though the upper arm is lowered due to a deflated tire.

5. A jack attachment attachable to the front portion of the frame of a vehicle for locking the front axle with the frame in which the frame and front axle are normally yieldably connected by a spring and knee action and in which the knee action comprises an upper horizontal pivotable arm attached to the frame, a lower horizontal pivotable arm, a spring attached to the lower pivotable arm and to the frame and a vertical arm pivotally attached to the upper and lower pivotable arms, said vertical arm also attached to the axle of the vehicle comprising a vertical support attachable to the frame and positioned sufficiently below the upper pivotable arm of the knee action so that the upper edge of the support will not come into contact with the upper vertical arm of the knee action when the axle is lowered due to a deflated tire, a rotatable rod journalled in said support and extending below and above said support, a hook attached to said rod adjacent the upper edge of said support and adapted to bear on said support when in engaging position thus locking said upper arm with said frame when the rod and hook are turned to engaging position to enable the axle to be lifted with the frame when an upward force is exerted on the frame, and said hook arranged when it is not in such engaging position for freely moving past the upper arm of the knee action to permit free movement of the yieldable connection between the frame and the axle, a spring attached to the lower end of the support around said rod and to said rod to prevent rattling when the hook is not in engaging position, a nut on the end of the rod above the hook and said rod positioned and extending sufficiently above the support to permit turning of the rod by a wrench inserted through an opening in the vehicle body from a point substantially above the frame of the vehicle.

6. An apparatus substantially as described for locking the frame of a vehicle such as an automobile with the axle in which the frame and the axle are normally yieldably connected by a spring and knee action in which the knee action comprises pivotal members connected by a link bearing the axle of the vehicle, comprising a vertical support attachable to the frame of the vehicle, a rotatable rod journalled in said support, a hook attached to said rod, said hook bearing on said support and engageable with one of said pivotal members to lock it with the frame of the vehicle when in engaging position, thus serving to raise the frame and axle together in locking position whenever a vertical movement is applied to the frame of the vehicle, and said hook arranged and adapted such that when it is not in engaging position it may freely move past the members of the knee action to permit free movement of the yieldable connection between the frame and the axle.

CLARENCE F. CARTER.